United States Patent
Levi et al.

(10) Patent No.: US 11,388,263 B2
(45) Date of Patent: Jul. 12, 2022

(54) PACKET TRANSMISSION USING SCHEDULED PREFETCHING

(71) Applicant: MELLANOX TECHNOLOGIES, LTD., Yokneam (IL)

(72) Inventors: Dotan David Levi, Kiryat Motzkin (IL); Daniel Marcovitch, Yokneam Illit (IL); Lior Narkis, Petah-Tikva (IL); Avi Urman, Yokneam Illit (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 173 days.

(21) Appl. No.: 17/067,690

(22) Filed: Oct. 11, 2020

(65) Prior Publication Data

US 2022/0116473 A1    Apr. 14, 2022

(51) Int. Cl.
H04L 49/90 (2022.01)
H04L 67/5681 (2022.01)
H04W 72/12 (2009.01)

(52) U.S. Cl.
CPC .......... *H04L 67/5681* (2022.05); *H04L 49/90* (2013.01); *H04W 72/1263* (2013.01); *H04L 49/9063* (2013.01)

(58) Field of Classification Search
None
See application file for complete search history.

(56) References Cited

U.S. PATENT DOCUMENTS

| | | | |
|---|---|---|---|
| 6,212,197 B1 | 4/2001 | Christensen et al. |
| 6,564,267 B1 | 5/2003 | Lindsay |
| 6,816,492 B1 | 11/2004 | Turner et al. |
| 6,954,432 B1 | 10/2005 | Bychowsky et al. |
| 7,224,669 B2 | 5/2007 | Kagan et al. |
| 7,245,627 B2 | 7/2007 | Goldenberg et al. |
| 7,676,597 B2 | 3/2010 | Kagan et al. |
| 8,370,675 B2 | 2/2013 | Kagan |

(Continued)

FOREIGN PATENT DOCUMENTS

| | | |
|---|---|---|
| AU | 2012216611 B2 | 3/2013 |
| CN | 103354989 A | 10/2013 |

(Continued)

OTHER PUBLICATIONS

U.S. Appl. No. 16/910,193 Office Action dated Jul. 7, 2021.

(Continued)

*Primary Examiner* — Ajit Patel
(74) *Attorney, Agent, or Firm* — Kligler & Associates Patent Attorneys Ltd (57) ABSTRACT

A Network-Connected Device (NCD) includes a network interface, a host interface, an NCD memory and an NCD processor. The network interface is configured for communicating over a network. The host interface is configured for communicating with a host. The NCD memory is configured to buffer packet information that originates from the host and pertains to a packet to be transmitted to the network at a specified transmission time. The NCD processor is configured to process the buffered packet information before the specified transmission time, and to transmit the packet to the network at the specified time. Processing of the packet information and transmission of the packet are decoupled from buffering of the packet information.

14 Claims, 9 Drawing Sheets

(56) References Cited

U.S. PATENT DOCUMENTS

| | | | |
|---|---|---|---|
| 9,390,056 | B1 | 7/2016 | Noureddine et al. |
| 9,397,960 | B2 | 7/2016 | Arad et al. |
| 9,450,846 | B1 | 9/2016 | Huang et al. |
| 9,667,446 | B2 | 5/2017 | Worrell |
| 10,027,601 | B2 | 7/2018 | Narkis et al. |
| 10,187,400 | B1 | 1/2019 | Castro et al. |
| 10,284,383 | B2 | 5/2019 | Bloch et al. |
| 10,320,508 | B2 | 6/2019 | Shimizu et al. |
| 10,727,966 | B1 | 7/2020 | Izenberg et al. |
| 2003/0002483 | A1 | 1/2003 | Zwack |
| 2004/0174820 | A1 | 9/2004 | Ricciulli |
| 2006/0153179 | A1 | 7/2006 | Ho et al. |
| 2008/0298380 | A1 | 12/2008 | Rittmeyer et al. |
| 2012/0201248 | A1 | 8/2012 | Aoki |
| 2014/0379714 | A1 | 12/2014 | Hankins |
| 2015/0046741 | A1 | 2/2015 | Fen et al. |
| 2015/0055508 | A1 | 2/2015 | Ashida et al. |
| 2015/0318015 | A1 | 11/2015 | Bose et al. |
| 2017/0171362 | A1 | 6/2017 | Bolotov et al. |
| 2017/0331926 | A1 | 11/2017 | Raveh et al. |
| 2018/0124812 | A1 | 5/2018 | Thubert et al. |
| 2018/0191629 | A1 | 7/2018 | Biederman et al. |
| 2019/0056972 | A1 | 2/2019 | Zhou et al. |
| 2019/0087352 | A1* | 3/2019 | Lee ............... G06F 12/0246 |
| 2019/0087652 | A1* | 3/2019 | Townsend ............. H04N 7/183 |
| 2019/0124524 | A1 | 4/2019 | Gormley |
| 2019/0149365 | A1* | 5/2019 | Chatterjee ............. H04L 5/0048 370/329 |
| 2019/0319730 | A1 | 10/2019 | Webb et al. |
| 2019/0379714 | A1 | 12/2019 | Levi et al. |
| 2020/0026656 | A1* | 1/2020 | Liao ................. H04L 67/1097 |
| 2020/0252320 | A1 | 8/2020 | Zemach et al. |
| 2020/0259759 | A1* | 8/2020 | Shalev ................. H04L 47/624 |
| 2021/0081352 | A1* | 3/2021 | Yang ................... H04L 69/22 |

FOREIGN PATENT DOCUMENTS

| | | | | |
|---|---|---|---|---|
| EP | 0607412 | B1 | 1/1999 | |
| JP | 2005529523 | A | 9/2005 | |
| JP | 2007042145 | A | 2/2007 | |
| WO | 9418627 | A2 | 8/1994 | |
| WO | 9857497 | A1 | 12/1998 | |
| WO | 2001037489 | A1 | 5/2001 | |
| WO | WO-2010117359 | A1 * | 10/2010 | ............ G06F 9/546 |

OTHER PUBLICATIONS

EP Application # 21181591.5 Search Report dated Sep. 17, 2021.
Baboescu et al., "Scalable Packet Classification," Proceedings of SIGCOMM'01, ACM, pp. 199-210, year 2001.
Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.
Davie et al., "An Expedited Forwarding PHB (Per-Hop-Behavior)", RFC 3246, Network Working Group, pp. 1-32, Mar. 2002.
Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.
U.S. Appl. No. 16/910,193 Office Action dated Dec. 17, 2021.
U.S. Appl. No. 16/921,993 Office Action dated Dec. 22, 2021.
U.S. Appl. No. 16/782,075 Office Action dated Apr. 5, 2021.
Wills, "Network Time Protocol (Version 1): Specification and Implementation," RFC 1059, pp. 2-59, Jul. 1988.
Wills, "Internet Time Synchronization: The Network Time Protocol," IEEE Transactions on Communication, vol. 39, No. 10, pp. 1482-1493, Oct. 1991.
Wills, "Network Time Protocol (Version 3): Specification, Implementation and Analysis," RFC 1305, pp. 1-96, Mar. 1992.
Wills, "Network Time Protocol (NTP)," RFC 0958, pp. 2-15, Sep. 1985.
IEEE Standard 1588-2008, "IEEE Standard for a Precision Clock Synchronization Protocol for Networked Measurement and Control Systems", pp. 1-289, year 2008.
Weibel et al., "Implementation and Performance of Time Stamping Techniques", 2004 Conference on IEEE 1588, pp. 1-29, Sep. 28, 2004.
InfiniBandTM Architecture Specification vol. 1, Release 1.2.1,pp. 1-1727, Nov. 2007.
Lu et al., "A Fast CRC Update Implementation", Computer Engineering Laboratory, Electrical Engineering Department, pp. 113-120, Oct. 8, 2003.
Mellette et al., "Toward Optical Switching in the Data Center", IEEE 19th International Conference on High Performance Switching and Routing (HPSR), pp. 1-6, Bucharest, Romania, Jun. 18-20, 2018.
Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.
O-RAN Alliance, "O-RAN Fronthaul Working Group; Control, User and Synchronization Plane Specification", ORAN-WG4.CUS. 0-v01.00, Technical Specification, pp. 1-189, year 2019.
Vattikonda et al., "Practical TDMA for Datacenter Ethernet", EuroSys conference, Bern, Switzerland, pp. 225-238, Apr. 10-13, 2012.
Ericsson AB et al., "'Common Public Radio Interface: eCPRI Interface Specification", V2.0, pp. 1-109, May 10, 2019.
Xilinx Inc., "Radio over Ethernet Framer v2.1", PB056 (v2.1), pp. 1-9, Oct. 30, 2019.
Weibel, H., "High Precision Clock Synchronization according to IEEE 1588 Implementation and Performance Issues", Zurich University of Applied Sciences, pp. 1-9, Jan. 17, 2005.
Sanchez-Palencia, J., "[RFC,v3,net-next,00/18] Time based packet transmission", pp. 1-14, Mar. 7, 2018.
IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.
Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.
Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.
Wikipedia,Precision Time Protocol, pp. 1-9, Apr. 20, 2020.
SMPTE Standard, "Professional Media Over Managed IP Networks:Traffic Shaping and Delivery Timing for Video", The Society of Motion Picture and Television Engineers, pp. 1-17, Nov. 22, 2017.
Wikipedia, "Time-Sensitive Networking", pp. 1-12, Mar. 5, 2020.
Levi et al., U.S. Appl. No. 16/782,075, filed Feb. 5, 2020.
Levi et al., U.S. Appl. No. 16/921,993, filed Jul. 7, 2020.
Mula et al., U.S. Appl. No. 16/910,193, filed Jun. 24, 2020.
U.S. Appl. No. 16/782,075 Office Action dated Oct. 5, 2020.

* cited by examiner

PACKET TRANSMISSION USING SCHEDULED PREFETCHING

FIELD OF THE INVENTION

The present invention relates generally to data networks, and particularly to prefetching and time-aware packet processing in network adapters.

BACKGROUND OF THE INVENTION

In various applications and use-cases there it is desirable to transmit data to a network at a specified time, and/or to minimize the latency of transmitting the data to the network. Example use-cases include transmission of packets over networks that operate in Time-Division Multiplexing (TDM) regimes, transmission of packets over optical switching networks, distributed High-Performance Computing (HPC) computing environments, as well as Precision Time Protocol (PTP) applications.

SUMMARY OF THE INVENTION

An embodiment of the present invention that is described herein provides a Network-Connected Device (NCD) including a network interface, a host interface, an NCD memory and an NCD processor. The network interface is configured for communicating over a network. The host interface is configured for communicating with a host. The NCD memory is configured to buffer packet information that originates from the host and pertains to a packet to be transmitted to the network at a specified transmission time. The NCD processor is configured to process the buffered packet information before the specified transmission time, and to transmit the packet to the network at the specified time. Processing of the packet information and transmission of the packet are decoupled from buffering of the packet information.

In some embodiments, the packet information includes one or more Work Queue Elements (WQEs) that instruct transmission of the packet. Additionally or alternatively, the packet information may include at least a part of the packet. Further additionally or alternatively, the packet information may include metadata relating to the packet.

In an embodiment, the host interface is configured to communicate with the host over a Peripheral Component Interconnect Express (PCIe) bus, and the NCD processor is configured to access the packet information without communicating over the PCIe bus. In another embodiment, the NCD memory is configured to receive the packet information directly from the host via the host interface, independently of the NCD processor.

In some embodiments, the NCD processor is configured to prefetch the packet information from the host to the NCD memory before the specified transmission time. In an example embodiment, the NCD processor is configured to prefetch the packet information by maintaining a prefetch Queue-Pair (QP) in the NCD, the prefetch QP configured to queue one or more prefetch Work Queue Elements (WQEs) that specify prefetching of the packet information to the NCD memory. In an embodiment, the NCD processor is configured to further maintain a synchronization Queue-Pair (QP), which queues doorbells that prevent transmission of the packet before the packet has been prefetched to the NCD memory.

There is additionally provided, in accordance with an embodiment of the present invention, a method including buffering, in a Network-Connected Device (NCD) that is connected to a host and to a network, packet information that originates from the host and pertains to a packet to be transmitted to the network at a specified transmission time. The buffered packet information is processed by the NCD before the specified transmission time, thereby transmitting the packet to the network at the specified time.

There is also provided, in accordance with an embodiment of the present invention, a Network-Connected Device (NCD) including a network interface, a host interface and an NCD processor. The network interface is configured for communicating over a network. The host interface is configured for communicating with a host. The NCD processor is configured to prefetch data from the host, to buffer the prefetched data in a memory, and to transmit the data buffered in the memory to the network.

In some embodiments, the memory is comprised in the NCD. In some embodiments, the host interface is configured to communicate with the host over a Peripheral Component Interconnect Express (PCIe) bus, and the NCD processor is configured to prefetch the data over the PCIe bus, and to transmit the buffered data without communicating over the PCIe bus. In some embodiments, the memory is located across the PCIe bus from the NCD, and the NCD processor is configured to access the memory using a PCIe mode having a predictable latency.

In an embodiment, the NCD processor is configured to prefetch the data using a Local Direct Memory Access (LDMA) command that transfers the data directly from a host memory of the host to the memory. In another embodiment, the NCD processor is configured to prefetch the data by maintaining a prefetch Queue-Pair (QP) in the NCD, the prefetch QP configured to queue one or more prefetch Work Queue Elements (WQEs) that specify prefetching of the data to the memory. The NCD processor may be configured to further maintain a synchronization Queue-Pair (QP), which queues doorbells that prevent transmission of the data before the data has been prefetched to the memory.

In a disclosed embodiment, the NCD processor is configured to transmit a first portion of the data to the network, and in parallel prefetch a second portion of the data from the host. In an embodiment, the data prefetched from the host includes an interim result in a collective operation performed by the host and by one or more other hosts.

There is further provided, in accordance with an embodiment of the present invention, a method in a Network-Connected device (NCD) that is connected to a host and to a network. The method includes prefetching data from the host to the NCD. The prefetched data is buffered in a memory accessible to the NCD. The data buffered in the memory is transmitted to the network.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for time-sensitive and/or small-latency transmission of data over communication networks. The disclosed techniques are useful, for example, in packet transmission over TDM networks or over optical switching networks, in HPC, in PTP applications, and in various other use-cases and environments that call for transmission of packets with accurate transmission timing and/or small processing latency.

The disclosed techniques can be implemented in various types of Network-Connected Devices (NCDs). In the present context, the term "NCD" refers to any device having network communication capabilities. Non-limiting examples of NCDs include network adapters such as Ethernet Network Interface Controllers (NICs) and Infiniband Host Channel Adapters (HCAs), Graphics Processing Units (GPUs) having network communication capabilities, network adapters having embedded CPUs (sometimes referred to as "Smart NICs"), and the like. The embodiments described herein refer mainly to network adapters, but this choice is made purely by way of example.

Some disclosed techniques relate to time-sensitive packet transmission, i.e., to applications that require transmission of a packet at a specified times with high accuracy. In some embodiments, a network node comprises a host and a network adapter that connects the host to a network. The host runs software that, among other functions, instructs the network adapter to transmit packets to the network at specified transmission times. In a typical implementation, the host generates packet data, and further generates Work-Queue Elements (referred to as "sender WQEs") that specify transmission of the packet data. The network adapter maintains one or more sender Queue-Pairs ("sender QPs") used for queuing pointers to the packet data and to the sender WQEs. The network adapter transmits the packets to the network by serving the sender QPs in accordance with a certain schedule.

In practice, the process of reading a sender WQE from a sender QP, and then retrieving the packet data that the sender WQE points to, may be long and may incur variable and unpredictable latency. Consider, for example, a commonly-used configuration in which the network adapter communicates with the host over a Peripheral Component Interconnect Express (PCIe) bus. In a conventional transmission process, the network adapter would need to perform two round-trip PCIe transactions with the host—One for retrieving the sender WQE, and another for retrieving the packet data that the sender WQE points to. The PCIe transactions incur both constant latency and jitter, either of which may be long and unpredictable. The constant latency of a PCIe transaction may differ, for example, from one network node to another due to differences in PCIe topology or other factors. On a given network node, the latency of PCIe transactions may jitter, for example due to time-varying load on the PCIe bus.

The above-described latency characteristics of PCIe are highly problematic in time-sensitive packet transmission applications. In some use-cases, if such a long and unpredictable latency were added to the packet processing time in the network adapter, the accuracy of the packet transmission time would be degraded to the point of being useless.

In some embodiments of the present invention, at least some of the PCIe latency overhead is avoided by pre-buffering packet information in the network adapter, or prefetching packet information to the network adapter, ahead of time. In the present context, the term "packet information" refers to sender WQEs that specify transmission of a packet, packet data, and/or packet metadata. Metadata may, for example, specify hardware offloading that the network adapter is requested to perform in processing of the packet, actions that the network adapter should take in case of failure of processing the packet, or any other suitable metadata.

In some embodiments, the network adapter comprises a network-adapter memory and a network-adapter processor. (When referring more generally to NCDs, an NCD comprises an NCD memory and an NCD processor. All the references below to "network-adapter memory" and "network-adapter processor" apply in a similar manner to "NCD memory" and "NCD processor," respectively.) In the present context, the term "network-adapter processor" (or "NCD processor") refers to any hardware, firmware and/or software elements that carry out packet processing tasks in the network adapter (or NCD). The network-adapter processor may comprise, for example, a packet scheduler that schedules and serves one or more sender QPs, and a transmission pipeline that transmits the packets to the network. The network-adapter memory (or NCD memory) is configured to buffer packet information that originates from the host and pertains to a packet to be transmitted to the network at a specified transmission time. The network-adapter processor is configured to process the buffered packet information before the specified transmission time, thereby transmitting the packet to the network at the specified time.

Various pre-buffering and prefetching schemes are described below. In some embodiments, upon generating a sender WQE pertaining to time-sensitive transmission of a packet, the host writes the sender WQE to a WQE buffer assigned in the network-adapter memory. Thus, at the specified transmission time, the sender WQE is already available to the network-adapter processor, without a need to retrieve it over the PCIe bus. In some embodiments, the host writes the packet data, as well, to the network-adapter memory prior to the specified transmission time.

Typically, the process of pre-buffering or prefetching packet information is decoupled from the process of processing and transmitting the packets. For example, packet information may be provided to the network-adapter memory (e.g., "pushed" by the host or prefetched by the network-adapter processor) depending on the available memory space. In parallel, the network-adapter processor typically processes and transmits packets depending on the transmission times specified for the packets.

In other embodiments, the host writes the sender WQE and the packet data to its own host memory. At a suitable time prior to the specified transmission time, the network-adapter processor prefetches the sender WQE and the packet data from the host memory to the network-adapter memory. In an example implementation, the network-adapter processor maintains an additional QP, referred to as a "prefetch QP." The prefetch QP holds pointers to "prefetch WQEs" that specify prefetching operations (of sender WQEs and packet data) from the host memory to the network-adapter memory.

Some disclosed embodiments provide methods for orchestration between one or more sender QPs and one or more prefetch QPs, i.e., between prefetching and transmission operations in the network adapter. Flexible affinities may be established between QPs. In some of these embodiments, the network-adapter processor maintains yet another QP, referred to as a "manager QP", for this purpose.

As noted above, the methods and systems described herein can be used in packet transmission over TDM networks or optical switching networks, in PTP applications such as one-step PTP, as well as in HPC. Example techniques for time-sensitive packet transmission are addressed, for example, in U.S. patent application Ser. No. 16/782,075, entitled "Network Adapter with Time-Aware Packet-Processing Pipeline," filed Feb. 5, 2020; and in Greek Patent Application 20200100141, entitled "TDMA Networking using Commodity NIC/Switch," filed Mar. 18, 2020. Both applications are assigned to the assignee of the present patent application and their disclosures are incorporated herein by reference.

Some disclosed techniques relate to use-cases in which a network switch that receives the data from the network adapter (or other NCD) has limited resources for processing the data, which in turn limit the achievable latency and/or throughput. One example use-case is in systems that perform distributed data reduction. The disclosed techniques employ prefetching in the network adapter to compensate for the lack of resources in the switch.

In an example use-case of this type, the switch has a small receive buffer, and a flow-control mechanism is used for throttling the data transfer rate from the network adapter to the switch. In such a case, the size of the switch receive buffer may be the bottleneck of the overall latency and throughput.

In some embodiments, to compensate for the adverse impact of the small-size switch receive buffer, the network adapter comprises a relatively large memory allocated for buffering data pending for transmission. In addition, the network adapter prefetches data from the host memory to the network adapter memory. The prefetching operation reduces the overall latency of data transmission. The latency saving is especially important when the latency of fetching data from the host memory to the network adapter is high, e.g., in the case of PCIe.

Various example implementation of prefetching mechanisms are described herein, including both hardware-implemented and software-controlled prefetching. Various orchestration schemes that coordinate the prefetching and transmission processes are also described.

Host-Initiated Writing of WQES and/or Packet Data to NIC MEMORY

Figure 1:
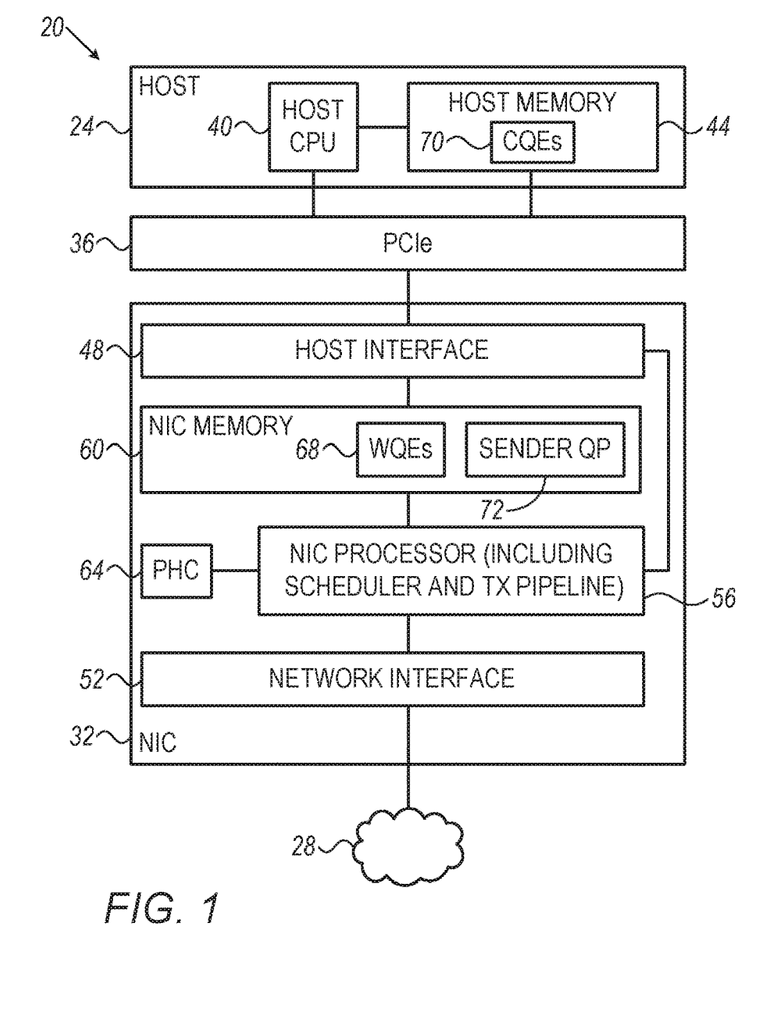
FIG. 1 is a block diagram that schematically illustrates a computing and communication system, in accordance with an embodiment of the present invention.

FIG. 1 is a block diagram that schematically illustrates a computing and communication system 20, in accordance with an embodiment of the present invention. In system 20, a host 24 connects to a communication network 28 using a Network Interface Controller (NIC) 32. Host 24 is also referred to herein as a network node. Host 24 may comprise, for example, a server, a workstation or any other suitable computer. Host 24 and NIC 32 communicate with one another over a Peripheral Component Interconnect Express (PCIe) bus 36. In alternative embodiments, any other suitable bus or interface can be used for connecting host 24 and NIC 32.

In the present example, network 28 comprises an Ethernet network. Alternatively, network 28 may comprise any other suitable type of network operating in accordance with any other suitable network protocol, e.g., Infiniband (IB). The embodiments described herein refer mainly to Ethernet NICs, but the disclosed techniques can be implemented in any other suitable type of network adapter, e.g., in Infiniband Host Channel Adapters (HCAs). The terms "NIC" and "network adapter" are used interchangeably herein, and so are terms such as "NIC memory" and "network-adapter memory", and "NIC processor" and "network-adapter processor". As noted above, network adapters are regarded herein as examples of Network-Connected Devices (NCDs), and the disclosed techniques can be applied in any other suitable type of NCD.

Host 24 comprises a host Central Processing Unit (CPU) 40 and a host memory 44. NIC 32 comprises a host interface 48 for communicating with host 24 over PCIe bus 36, and a network interface 52 for communicating with network 28. NIC 32 further comprises a NIC processor 56 and a NIC memory 60. NIC processor 56 carries out the various packet processing tasks of the NIC, including, for example, packet scheduling and transmission. NIC memory 60 is used for storing packet data and metadata, as well as any other relevant information.

In some embodiments, NIC processor 56 is aware of and synchronized with the current network time, e.g., using the Precision Time Protocol (PTP). In an example embodiment, NIC 32 comprises a PTP Hardware Clock (PHC) 64 that tracks the network time. NIC processor 56 uses the network time for time-sensitive packet transmission, i.e., for transmitting packets at specified times with high accuracy.

In various embodiments, PHC 64 may be implemented and operated in any suitable configuration. Example PHC configurations are described, for example, in U.S. Pat. No. 8,370,675, and in U.S. Provisional Patent Application 63/047,275, filed Jul. 2, 2020, whose disclosures are incorporated herein by reference. In some embodiments, PHC 64 comprises (i) a timer that is incremented by a suitable system clock (e.g., a 250 MHz clock), (ii) suitable registers that store the actual network time, e.g., UTC time in seconds and nanoseconds. Suitable software in host CPU 40 estimates the drift between the system clock and the network time, and corrects the timer in PHC 64 to compensate for the drift.

Alternatively to using a PHC, in some embodiments NIC 32 may be provided with the network time using other means. Further aspects of time-sensitive packet transmission are addressed in U.S. patent application Ser. No. 16/782,075, cited above.

In some embodiments, host CPU 40 instructs NIC 32 to transmit packets at specified transmission times (e.g., specified network times in accordance with PHC 64). NIC 32 is required to comply with the specified transmission times with high accuracy. For transmitting a packet, host CPU 40 typically generates the data for the packet, and one or more Work-Queue Elements (referred to as "sender WQEs") that specify the transmission of the packet.

NIC processor 56 maintains one or more sender Queue-Pairs ("sender QPs") 72 in NIC memory 60. Sender QPs 72 are used for queuing pointers to the packet data and to the sender WQEs. NIC processor 56 transmits the packets to network 28 by serving sender QPs 72 in accordance with a certain schedule.

In an embodiment, in order to reduce latency jitter, memory space is assigned in NIC memory 60 to serve as a WQE buffer 68. When instructing NIC 32 to transmit a packet at an accurate specified time, host CPU 40 writes the (one or more) sender WQEs for this packet directly to WQE buffer 68 in NIC memory 60. Host CPU 40 typically writes the WQEs to WQE buffer 68 using Direct Memory Access (DMA), without involving NIC processor 56. In this manner, when NIC processor 56 starts transmission of the packet, the relevant WQEs are already available locally in NIC memory 60, and NIC processor 56 does not need to retrieve the WQEs across PCIe bus 36. When execution of a WQE is completed, NIC processor 56 posts a respective Completion Queue Element (CQE) on a completion queue 70 in host memory 44.

In an embodiment, when instructing NIC 32 to transmit a packet, host CPU 40 writes the WQEs to NIC memory 60 as described above, and also writes the packet data to NIC memory 60 (e.g., directly using DMA). In this embodiment (referred to as "OPTION 1"), NIC processor 56 does not have to retrieve the WQEs or the packet data over PCIe bus 36 when transmitting the packet. Latency jitter is thus kept to a minimum.

In an alternative embodiment (referred to as "OPTION 2"), host CPU 40 writes the WQEs to NIC memory 60 as described above, but writes the packet data to host memory 44. In this embodiment, NIC processor 56 does not have to retrieve the WQEs over PCIe bus 36, but still has to retrieve the packet data over PCIe bus 36.

Figure 2:
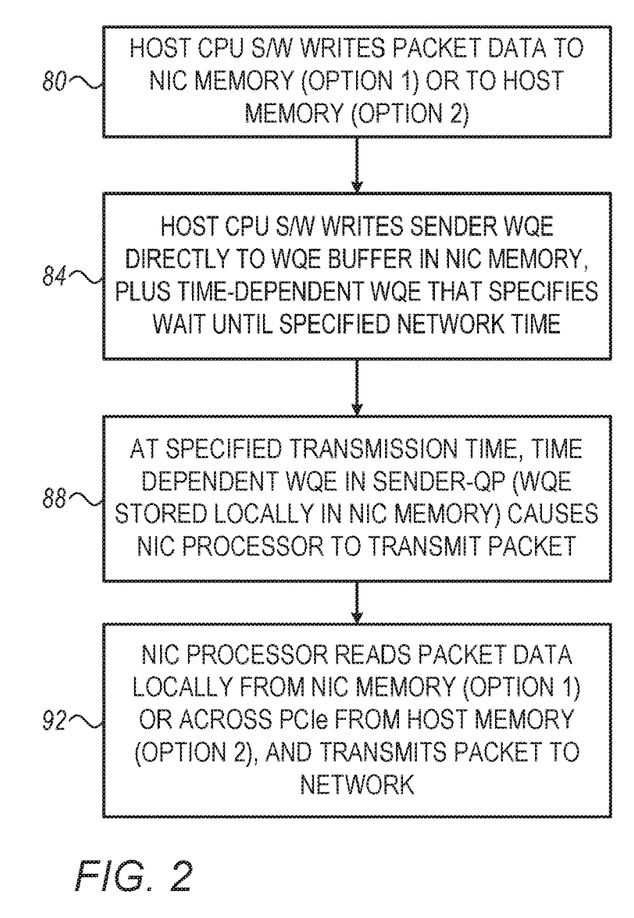
FIG. 2 is a flow chart that schematically illustrates a method for time-sensitive packet transmission in the system of FIG. 1, in accordance with an embodiment of the present invention.

FIG. 2 is a flow chart that schematically illustrates a method for time-sensitive transmission of a packet in system 20 of FIG. 1, in accordance with an embodiment of the present invention. The method begins with host CPU 40 writing the packet data to NIC memory 60 (when using OPTION 1) or to host memory 44 (when using OPTION 2), at a data writing step 80.

At a WQE writing step 84, host CPU 40 writes the WQEs pertaining to the packet to WQE buffer 68 in NIC memory 60. In an embodiment, host CPU 40 enforces the time-sensitive transmission by writing a special WQE, referred to as a "time-dependent WQE", before writing the sender WQEs of the packet. The time-dependent WQE is posted on the same sender QP as the sender WQEs of the packet, and indicates the specified transmission time.

When scheduling the various WQEs posted on the various sender QPs 72, NIC processor 56 interprets the time-dependent WQE as an instruction not to serve the sender QP in question until the specified time. Thus, the time-dependent WQE ensures that the sender WQEs of the packet will not be served until the specified transmission time. The scheduler in NIC processor 56 typically scans sender QPs 72 at a high rate, e.g., thirty-two QPs per 3-4 nSec clock cycle, so that the actual transmission time will be very close to the specified transmission time.

At a transmission initiation step 88, NIC processor 56 initiates transmission of the packet at the specified time. In an embodiment, packet transmission is initiated when the scheduler in NIC processor 56 finds that the current network time (e.g., the time indicated by PHC 64) is at least the transmission time specified in the time-dependent WQE. NIC processor 56 then proceeds to serve the sender WQEs pertaining to the packet.

At a transmission step 92, NIC processor 56 reads the packet data and transmits the packet to network 28 via network interface 52. If OPTION 1 is implemented, NIC processor 56 reads the packet data locally from NIC memory 60. If OPTION 2 is implemented, NIC processor 56 reads the packet data from host memory 44 over PCIe bus 36.

NIC-Initiated Prefetching of WQES and/or Packet Data to Network-Adapter Memory

Figure 3:
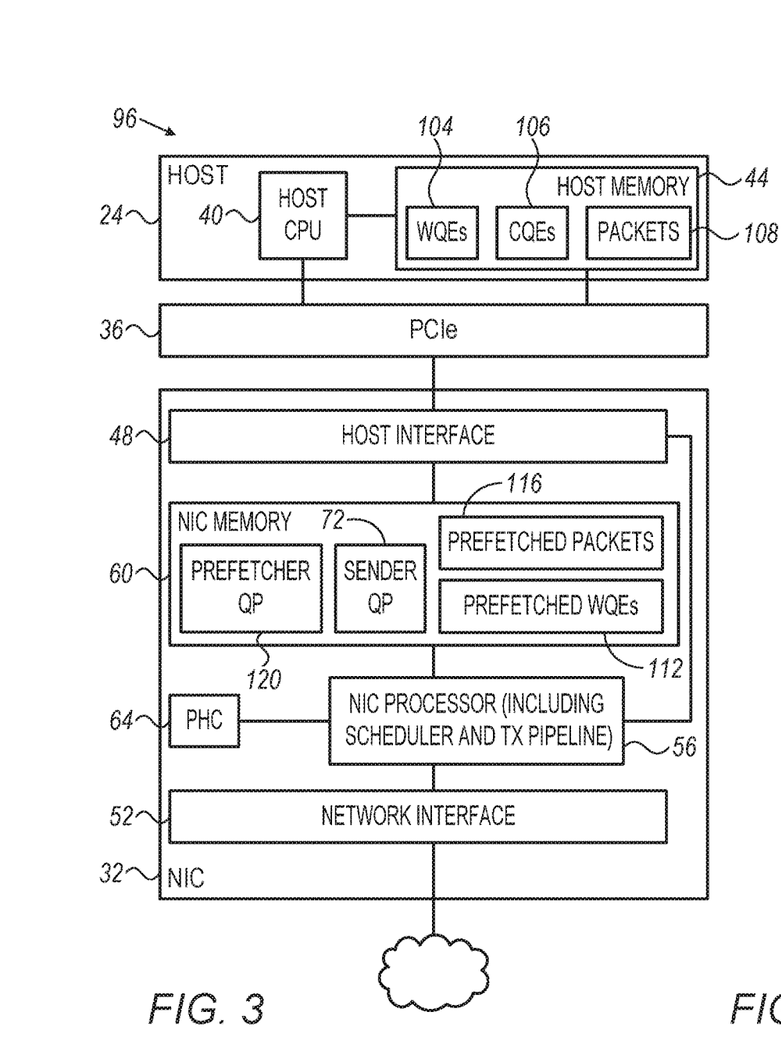
FIG. 3 is a block diagram that schematically illustrates a computing and communication system, in accordance with an alternative embodiment of the present invention.

FIG. 3 is a block diagram that schematically illustrates a computing and communication system 96, in accordance with an alternative embodiment of the present invention. Many of the components of system 96 are similar in structure and functionality to the corresponding components of system 20 (FIG. 1). The differences in structure and functionality between the two systems are explained below.

In the alternative embodiment of FIG. 3, when instructing NIC 32 to transmit a packet at a specified transmission time, host CPU 40 stores both the packet data and the sender WQEs locally in host memory 44. At a suitable time prior to the specified transmission time, NIC processor 56 prefetches the packet data and sender WQEs from host memory 44 to NIC memory 60. Thus, at the specified transmission time, the packet data and sender WQEs are available locally to NIC processor 56 without a need to retrieve them over PCIe bus 36.

In this embodiment, host memory 44 comprises a WQE buffer 104 for storing WQEs generated by host CPU 40, a completion queue 106 for posting CQEs upon completing execution of corresponding WQEs, and a packet data buffer 108 for storing packet data generated by host CPU 40. NIC memory 60 comprises a prefetched WQE buffer 112 for storing WQEs prefetched by NIC processor 56, and a prefetched packet data buffer 116 for storing packet data prefetched by NIC processor 56. NIC memory 60 further comprises a "prefetcher QP" 120 that is used by NIC processor 56 for managing the prefetching of packet data and sender WQEs from the host memory to the NIC memory. In an alternative embodiment, NIC memory 60 comprises a hybrid queue that serves as the receive queue of the host QP and as the send queue for the NIC QP.

Figure 4:
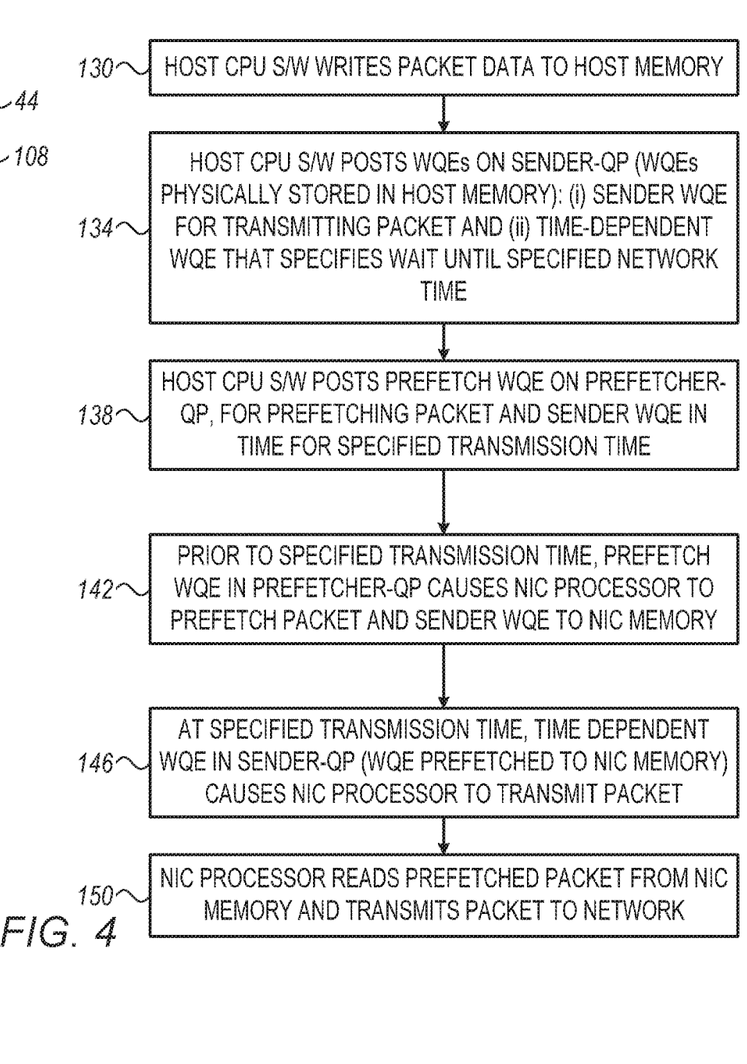
FIG. 4 is a flow chart that schematically illustrates a method for time-sensitive packet transmission in the system of FIG. 3, in accordance with an embodiment of the present invention.

FIG. 4 is a flow chart that schematically illustrates a method for time-sensitive transmission of a packet in system 96 of FIG. 3, in accordance with an embodiment of the present invention. The method begins with host CPU 40 writing the packet data to packet data buffer 108 in host memory 44, at a data writing step 130.

At a sender-WQE writing step 134, host CPU 40 generates sender WQEs pertaining to the packet, for posting on sender QP 72. As explained above, the sender WQEs may comprise (i) one or more WQEs that specify metadata and/or point to the packet data, and (ii) a time-dependent WQE ("wait WQE") that prevents serving of subsequent sender WQEs on the same sender QP until the specified transmission time. The host CPU writes the generated sender WQEs to WQE buffer 104 in host memory 44.

At a prefetch-WQE writing step 138, host CPU 40 generates one or more prefetch WQEs, and posts the prefetch WQEs on prefetcher QP 120. The prefetch WQEs specify (i) prefetching of the packet data from buffer 108 in host memory 44 to buffer 116 in NIC memory 60, and (ii) prefetching of the sender WQEs from buffer 104 in host memory 44 to buffer 112 in NIC memory 60. Both prefetching operations are typically specified as direct memory-to-memory copy (or move) operations that do not involve host CPU 40. In an embodiment, the prefetch-WQEs specify a time at which NIC processor 56 is to prefetch the sender WQEs and packet data. The prefetch time is typically set to be sufficiently earlier than the transmission time, e.g., earlier by at least the expected worst-case durations of the prefetch transactions, including latencies expected on PCIe bus 36.

At a prefetching step 142, when reaching the time set for prefetching, the prefetch WQE on prefetcher QP 120 causes the scheduler in NIC processor 56 to initiate prefetching of the packet data and the sender WQEs. When triggered, NIC processor 56 (i) prefetches the packet data from buffer 108 in host memory 44 to buffer 116 in NIC memory 60, and (ii) prefetches the sender WQEs from buffer 104 in host memory 44 to buffer 112 in NIC memory 60. As noted above, both prefetch operations are typically direct memory-to-memory operations, performed by NIC processor 56 without involving host CPU 40. At this point, after prefetching the sender WQEs are posted on sender QP 72 and are stored locally in buffer 112 in NIC memory 60.

At a transmission initiation step 146, NIC processor 56 initiates transmission of the packet at the specified transmission time. As noted above, in an embodiment, packet transmission is initiated when the scheduler in NIC processor 56 finds that the current network time (e.g., the time indicated by PHC 64) is at least the transmission time specified in the time-dependent WQE posted on sender QP 72. NIC processor 56 then proceeds to serve the sender WQEs pertaining to the packet.

At a transmission step 150, NIC processor 56 reads the packet data and transmits the packet to network 28 via network interface 52. NIC processor 56 reads the packet data locally from buffer 116 in NIC memory 60.

Orchestration Between Prefetching and Transmission

In order for the prefetching mechanisms of system 96 (FIG. 3) to operate correctly, it is typically required to synchronize sender QP 72 and prefetcher QP 120. The synchronization scheme (also referred to as "orchestration") ensures that NIC processor 56 will start transmitting a packet (in accordance with sender QP 72) only after the packet data and sender WQEs have been prefetched to the NIC memory (in accordance with prefetcher QP 120). In some embodiments, system 96 maintains a "manager QP" in NIC memory 60 for this purpose.

Figure 5:
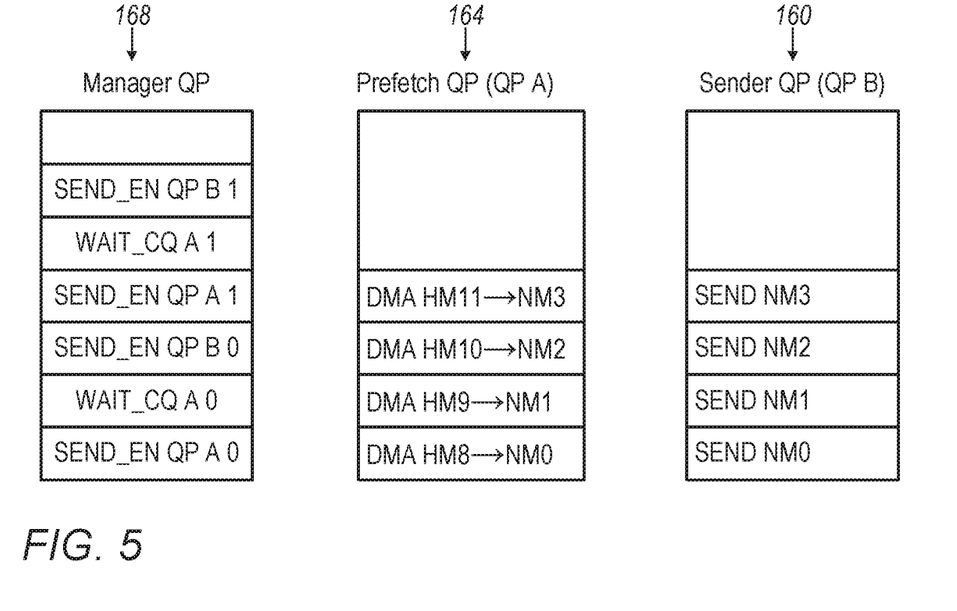
FIGS. 5-7 are diagrams showing orchestration schemes between prefetching and transmission operations in the system of FIG. 3, in accordance with embodiments of the present invention.

FIG. 5 is a diagram showing an orchestration scheme between prefetching and transmission operations in system 96 of FIG. 3, in accordance with an embodiment of the present invention. The figure shows three QPs that are managed by NIC processor 56 in NIC memory 60—A sender QP 160 (also referred to as "QP B"), a prefetcher QP 164 (also referred to as "QP A"), and a manager QP 168. In this example (and in the subsequent examples below) the order of serving the QPs is from the bottom of the figure upwards.

Sender QP 160 (QP B) stores sender WQEs (denoted "SEND" in the figure) that specify transmission of packets from NIC memory 60 to the network. Regions in NIC memory 60 are denoted NM0, NM1, NM2, . . . . Prefetcher QP 164 (QP A) stores prefetch WQEs (denoted "DMA" in the figure) that specify prefetching from host memory 44 to NIC memory 60. Regions in host memory 44 are denoted HM0, HM1, HM2, . . . and regions in NIC memory 60 are denoted NM0, NM1, NM2, . . . .

In an embodiment, host CPU 40 posts entries (referred to as doorbells) on manager QP 168. The doorbells specify dependencies between sender QP 160 and prefetcher QP 164, and thus orchestrate the prefetching and packet transmission operations. In the example of FIG. 5, the doorbells on manager QP 168 force the following dependencies (from bottom to top):

"SEND_EN QP A 0"—Enables serving the first entry on prefetcher QP 164. As a result, NIC processor 56 will perform the prefetching operation "DMA HM8⇒NM0".

"WAIT_CQ A 0"—Prevents subsequent prefetching until a Completion Queue Element (CQE) is posted on the Completion Queue (CQ) of prefetcher QP 164. In other words, the "WAIT_CQ A 0" doorbell forces NIC processor 56 to wait until the "DMA HM8⇒NM0" prefetch operation is completed.

"SEND_EN QP B 0"—Enables serving the first entry on sender QP 160. As a result, NIC processor 56 will perform the "SEND NM0" operation, i.e., transmit a portion of the packet stored in memory region NM0 in NIC memory 60. As dictated by the previous "WAIT_CQ A 0" doorbell on the manager QP, the transmission operation "SEND NM0" cannot begin until the prefetching operation that prepares this data ("DMA HM8⇒NM0") has been completed.

"SEND_EN QP A 1"—Enables serving the second entry on prefetcher QP 164. As a result, NIC processor 56 will perform the prefetching operation "DMA HM9⇒NM1". Note that this prefetching operation can be performed in parallel to the "SEND NM0" transmission operation—The manager QP does not prevent this parallelization.

"WAIT_CQ A 1"—Prevents subsequent prefetching until the Completion Queue (CQ) of prefetcher QP 164 indicates that the "DMA HM9⇒NM1" prefetch operation is completed.

"SEND_EN QP B 1"—Enables serving the second entry on sender QP 160. As a result, NIC processor 56 will perform the "SEND NM1" operation, i.e., transmit the portion of the packet stored in memory region NM1 in NIC memory 60. As dictated by the previous "WAIT_CQ A 1" doorbell on the manager QP, the transmission operation "SEND NM1" cannot begin until the prefetching operation "DMA HM9⇒NM1" has been completed.

. . . .

Figure 6:
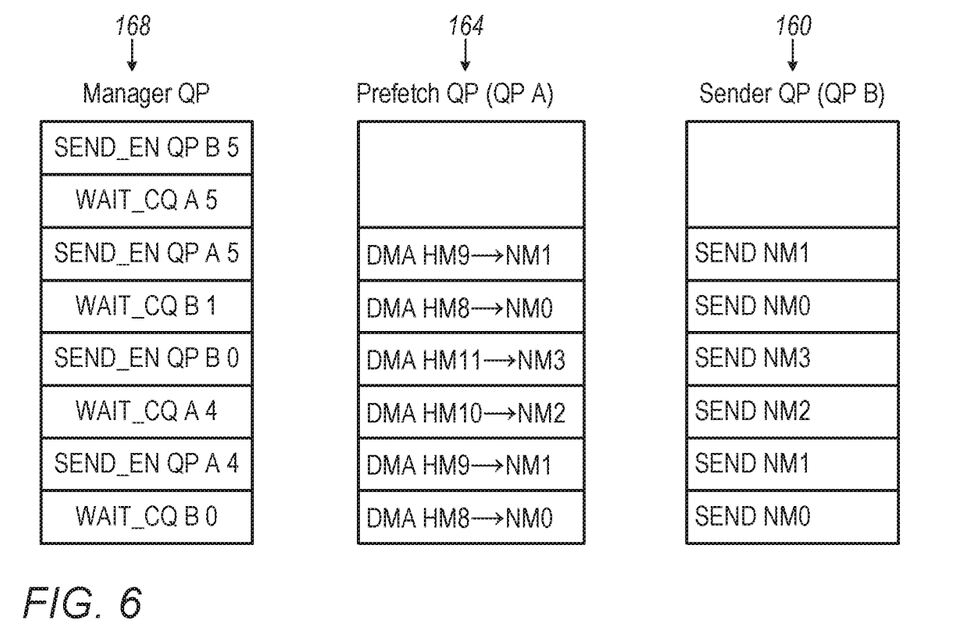

FIG. 6 is a diagram showing another orchestration scheme between prefetching and transmission operations in system 96 of FIG. 3, in accordance with an embodiment of the present invention. This example uses the same QPs as the example of FIG. 5. In the present example, however, memory space in NIC memory 60 (e.g., buffers 112 and 116) is limited to four regions denoted NM0-NM3. The doorbells posted by host processor 40 prefetch packet portions cyclically to memory regions NM0-NM3. The doorbells ensure that the data in a given memory region has been transmitted before overwriting it with a new prefetching operation.

Orchestration and Time-Sensitive Transmission

The examples of FIGS. 5 and 6 above explained how prefetching and transmission can be orchestrated to ensure correct operation, but did not address the requirement to transmit packets at accurate specified transmission times.

In some embodiments, system 96 (FIG. 3) is required to transmit a sequence of packets at specified transmission times denoted N, N+1, N+2, . . . . In an embodiment, memory space in NIC memory 60 (e.g., buffers 112 and 116) is divided into two sub-spaces referred to as "odd memory" and "even memory". NIC processor 56 alternates between the odd and even memories at successive packet transmission times (N, N+1, N+2, . . . ). At any given interval between transmission times, the NIC processor transmits a packet from one NIC odd/even subspace, and copies (prefetches) the next packet from the host memory to the other NIC odd/even subspace.

For example, the NIC processor may perform the following alternation:
- Transmit $N^{th}$ packet from even NIC memory, while copying (prefetching) $N+1^{th}$ packet from host memory to odd NIC memory.
- Transmit $N+1^{th}$ packet from odd NIC memory, while prefetching $N+2^{th}$ packet from host memory to even NIC memory.
- Transmit $N+2^{th}$ packet from even NIC memory, while prefetching $N+3^{th}$ packet from host memory to odd NIC memory.
- . . . .

Figure 7:
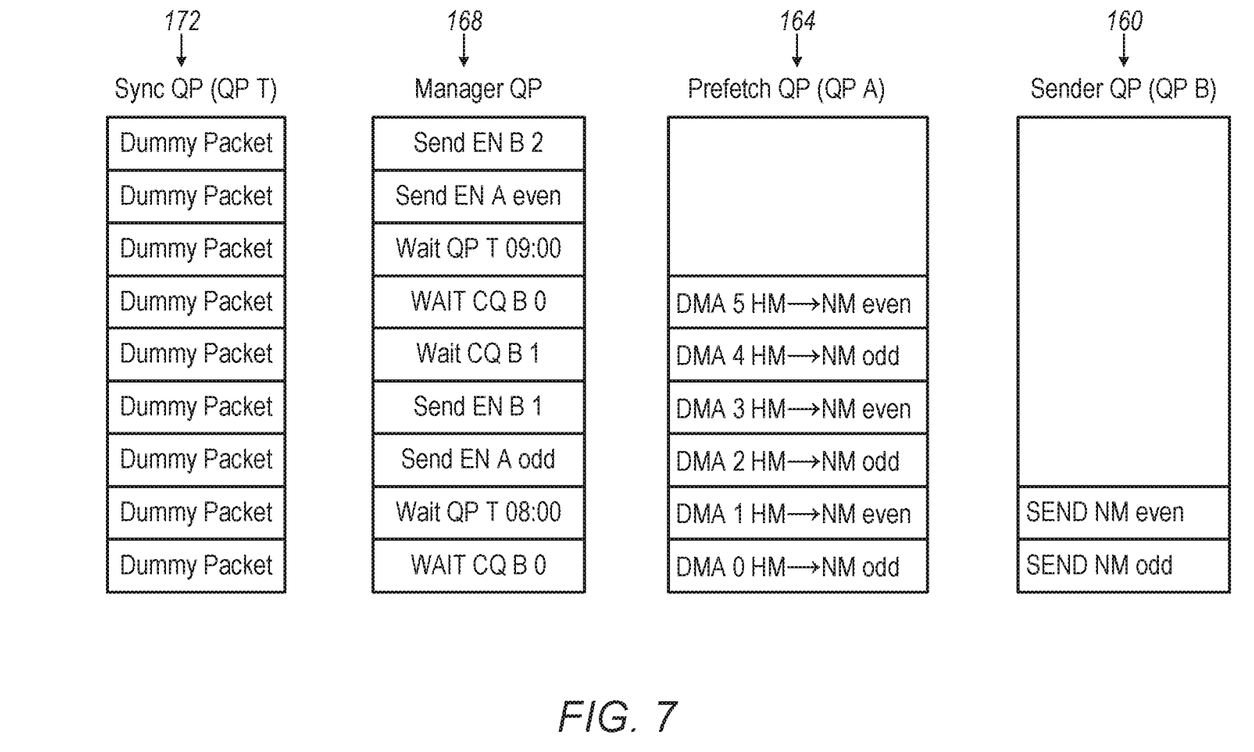

FIG. 7 is a diagram showing an orchestration scheme between prefetching and time-sensitive transmission operations in system 96 of FIG. 3, in accordance with an embodiment of the present invention. In this example, NIC processor 56 manages yet another QP in NIC memory 60. The additional QP is referred to a synchronization QP 172 (QP T), and it is used for enforcing transmission at the specified times. Synchronization QP 172 holds dummy WQEs, which correspond to dummy packets that are not physically transmitted to network 28.

Prefetching in Network Adapter for Compensating for Lack of Switch Resources

The embodiments described above referred mainly to mechanisms, such as prefetching, which enable time-sensitive transmission notwithstanding unpredictable latencies such as PCIe-bus latency. Prefetching in network adapters, however, is in no way limited to time-sensitive transmission applications. The description that follows demonstrates the use of prefetching to compensate for lack of resources in a switch that receives the data from the network adapter. One example use-case is in systems that perform data reduction. Further aspects of data reduction implemented in network elements are addressed, for example, in U.S. Pat. No. 10,284,383, whose disclosure is incorporated herein by reference.

Figure 8:
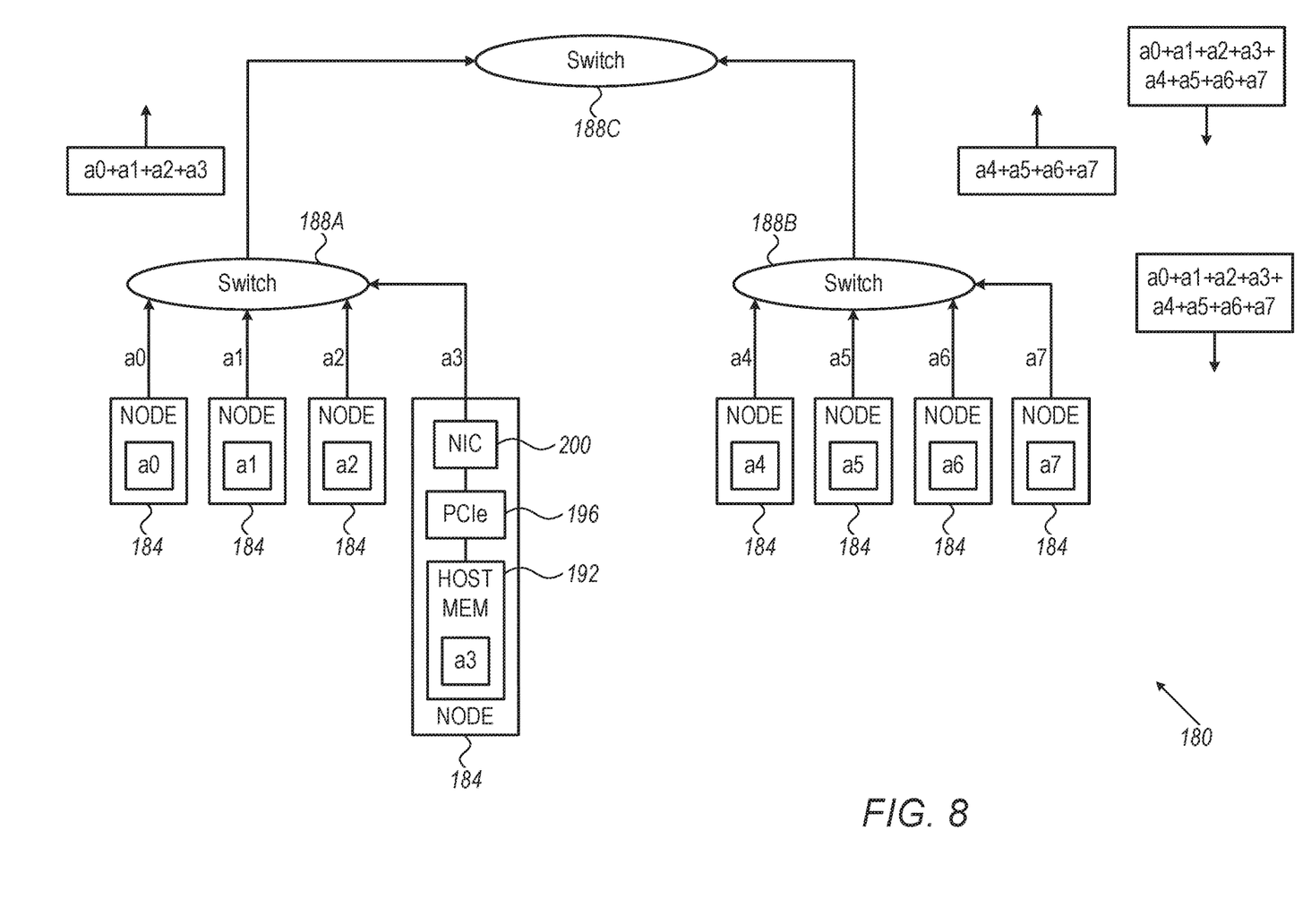
FIG. 8 is a block diagram that schematically illustrates a computing and communication system that performs a data reduction operation, in accordance with an embodiment of the present invention.

FIG. 8 is a block diagram that schematically illustrates a computing and communication system 180 that performs a data reduction operation, in accordance with an embodiment of the present invention. System 100 comprises multiple compute nodes (hosts) 184 and multiple network switches 188, in the present example eight nodes 184 and three switches 188A, 188B and 188C. Each node 184 comprises a host memory 192 and a NIC 200 that communicate over a PCIe bus 196. Each node 184 further comprises a CPU, which is omitted from the figure for clarity. Also for the sake of clarity, the internal compute-node structure is shown only for one of nodes 184. The other nodes 184 typically have a similar structure.

In the present example system 100 operates in accordance with the Infiniband specifications, in which case switches 188 comprise Infiniband switches and NICs 200 comprise Infiniband HCAs. Alternatively, the disclosed techniques can also be use with other networking protocols, e.g., in Ethernet systems.

In the example of FIG. 8, the eights nodes 184 hold respective data values a0 . . . a7 in their host memories 192, and switches 188A-C perform a reduction operation that (i) computes the sum a0+a1+ . . . +a7, and (ii) distributes the computed sum to one or more of nodes 184. Switches 188A-C are arranged in a tree, with switch 188C serving as the root of the tree. Each switch receives data values from lower-level elements (nodes or switches) and sums the data values. Each non-root switch forwards the sum to the switch at the next-upper level of the tree. The root switch computes the final sum and distributes the final sum as needed. In the present example, switch 188A computes the sum a0+a1+a2+a3 and forwards the result to switch 188C; switch 188B computes the sum a4+a5+a6+a7 and forwards the result to switch 188C; and switch 188C computes the final sum (a0+a1+a2+a3)+(a4+a5+a6+a7).

As can be appreciated, in a reduction operation a given switch cannot complete its part of the computation until it has received all the data values from the lower level. Reduction operations are therefore highly sensitive to the throughput and latency of data transfer, both from the compute nodes to the switches and between the switches. Network switches, however, typically have small receive buffers that may limit the latency and throughput of receiving data. The description below shows how prefetching mechanisms in NICs 200 can compensate for this deficiency of the network switches.

Figures 9A, 9B:
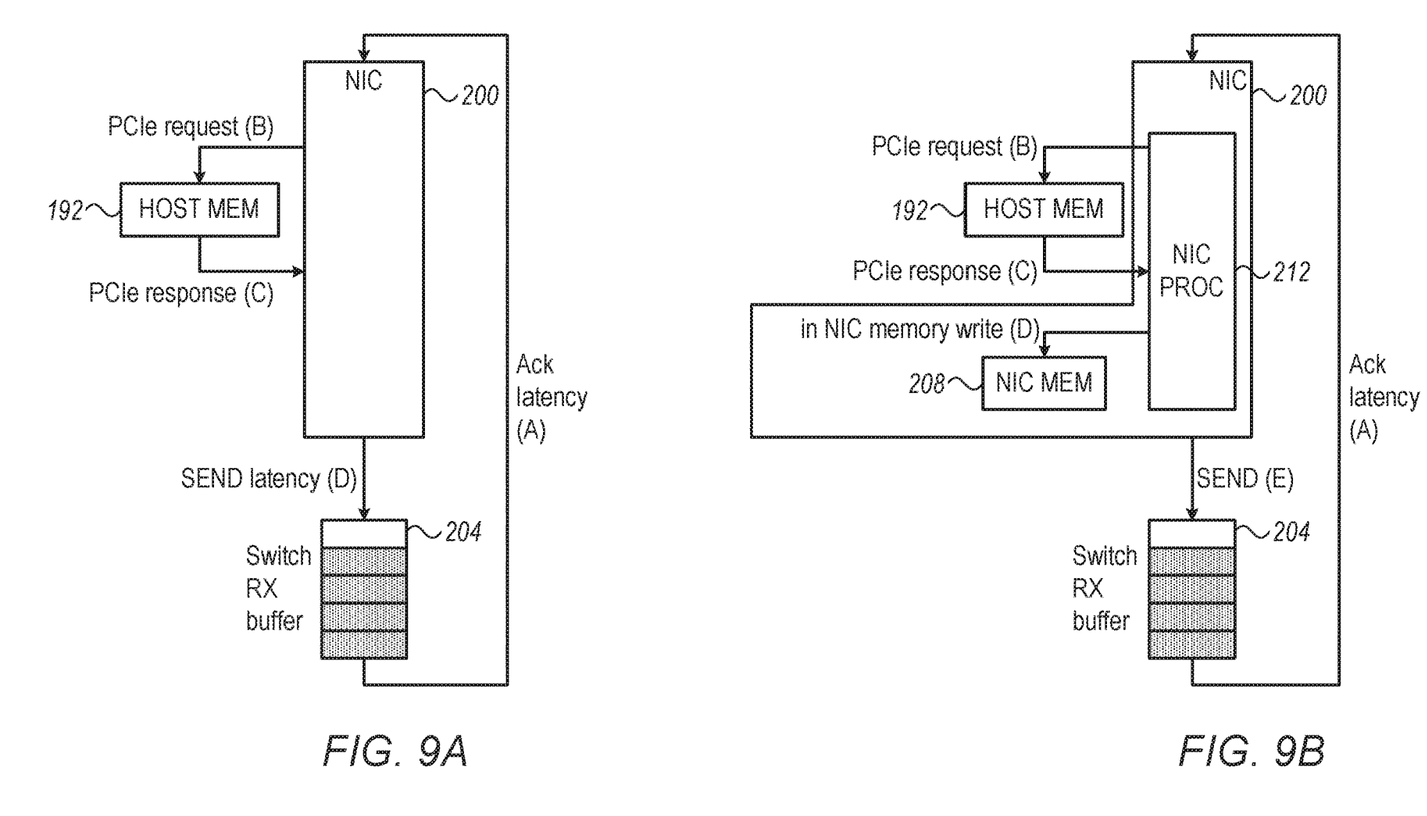
FIGS. 9A and 9B are block diagrams that schematically illustrate a prefetching mechanism in a network adapter, which compensates for a small switch receive buffer, in accordance with an embodiment of the present invention.

FIGS. 9A and 9B are block diagrams that schematically illustrate a prefetching mechanism in NICs 200, which compensates for the small receive buffers in switches 188A-C, in accordance with an embodiment of the present invention. FIG. 9A illustrates the data transfer process without the disclosed prefetching technique, and the resulting impact on latency, as a reference. FIG. 9B illustrates the data transfer process with prefetching, in accordance with an embodiment of the present invention.

Consider FIG. 9A first. The figure shows a receive (RX) buffer 204 that receives data from NIC 200. Referring to system 100 of FIG. 8, for example, NIC 200 may comprise the NIC of a certain node 184, and RX buffer 204 may reside in the switch 188 connected to that node. RX buffer 204 receives data from NIC 200, buffers the data and provides it to subsequent elements of switch 188 for processing.

Typically, NIC 200 and switch 188 support a transport-level flow-control mechanism that regulates data transfer from NIC 200 to RX buffer 204 of switch 188. In one example, switch 188 sends to NIC 200 "credits" that are indicative of the amount of data that RX buffer 204 is able to receive. When RX buffer 204 gradually fills-up (when the filling-up rate is higher than the emptying rate), fewer credits are sent to NIC 200, which in turn throttles down the rate of data transfer to the switch. When RX buffer 204 gradually empties (when the filling-up rate is lower than the emptying rate), more credits are sent to NIC 200, which in turn throttles up the rate of data transfer.

Without the disclosed prefetching technique, NIC 200 fetches data (for sending to switch 188) from host memory 192, across PCIe bus 192, in response to space becoming available in RX buffer 204 of the switch. The limited size of RX buffer 204 increases the latency of data transfer. As seen in FIG. 9A, the latency budget comprises a sum of the following latencies:

ACK latency (A): The latency from the time data (e.g., a message or packet) leaves RX buffer 204, until the switch's flow control mechanism notifies NIC 200 it is ready to receive additional data.

PCIe request latency (B): The latency of requesting data from host memory 192 over PCIe bus 196.

PCIe response latency (C): The latency of receiving the requested data from host memory 192 over PCIe bus 196.

Send latency (D): The latency of transferring the data from NIC 200 to RX buffer 204.

In many practical cases, the PCIe-related latencies (PCIe request latency and PCIe response latency) are high and/or unpredictable, e.g., when using PCIe switches, when using accelerators or GPUs, in case of memory cache misses, etc. In typical implementations, although not necessarily, the total PCIe related latency (B+C) may be in the range of several hundreds of nanoseconds to several microseconds. The send latency is usually, although not necessarily, less than 250 nanoseconds.

FIG. 9B illustrates a prefetching mechanism in NIC 200, which compensates for the adverse effect of the small size of RX buffer 204, in accordance with an embodiment of the present invention. In the present embodiment, NIC 200 comprises a NIC processor 212 and a NIC memory 208. NIC 200 further comprises a network interface for communicating over the network, in the present example with one of switches 188; and a host interface for communicating with the host, in the present example with PCIe bus 196 of the hosting compute node 184. The network interface and the host interface are omitted from the figure, and from subsequent figures, for the sake of clarity.

Among other functions, NIC processor 212 prefetches data ahead of time from host memory 192 to NIC memory 208. With this implementation, when the data is due to be sent to RX buffer 204 of switch 188, the data is already available locally in NIC memory 208. The latency budget in this embodiment comprises only the following latencies:

ACK latency (A): The latency from the time data (e.g., a message or packet) leaves RX buffer 204, until the switch's flow control mechanism notifies NIC 200 it is ready to receive additional data.

In NIC latency (D): The (relatively small and predictable) latency of accessing NIC memory 208.

Send latency (E): The latency of transferring the data from NIC 200 to RX buffer 204.

As seen, when using prefetching the PCIe request latency (B) and the PCIe response latency (C) do not affect the overall latency budget as they did in the scheme of FIG. 9A. Note that, in order to compensate for the small size of RX buffer 204 of switch 188, the size of NIC memory 208 should be large enough to account for the PCIe-related latencies. A typical size for the NIC memory is on the order of 4 Mbytes. Alternatively, however, any other suitable memory size can be used.

In some embodiments, the prefetching and sending operations of NIC processor 212 are implemented purely in hardware. In an embodiment, upon sending data to RX buffer 204, NIC processor 212 deletes the data from NIC memory 208 (or at least allows the data to be overwritten). In this embodiment, in case certain data needs to be retransmitted, the data is prefetched from host memory 192 again.

In alternative embodiments, the NIC processor prefetches the data to a memory that is accessible to the NIC processor, but is located across the PCIe bus from the NIC. Such a memory may reside, for example, in the host or in another device coupled to the PCIe bus. In these embodiments, the NIC processor typically accesses the memory using a PCIe mode having a predictable latency.

Figure 10:
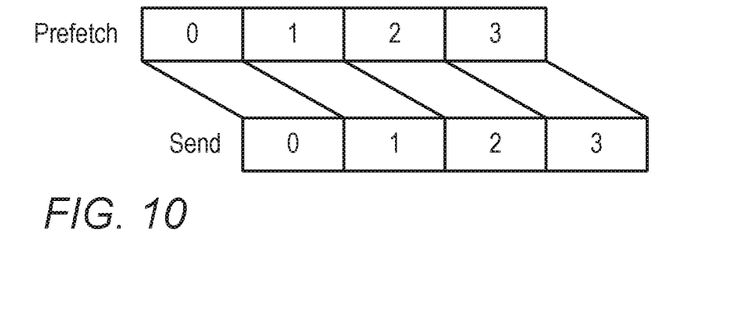
FIG. 10 is a diagram that schematically illustrates pipelined prefetching and sending operations in a network adapter, in accordance with an embodiment of the present invention.

FIG. 10 is a diagram that schematically illustrates pipelined prefetching and sending operations in NIC 200, in accordance with an embodiment of the present invention. NIC processor 212 typically operates in such a pipelined manner to avoid unnecessary loss of throughput. In this example, in parallel with sending a certain data unit (e.g., message or packet—labeled "0") NIC processor 212 prefetches the next data unit (labeled "1"). Similarly, while sending data unit "1", NIC processor 212 prefetches the next data unit (labeled "2"), and so on.

Figure 11:
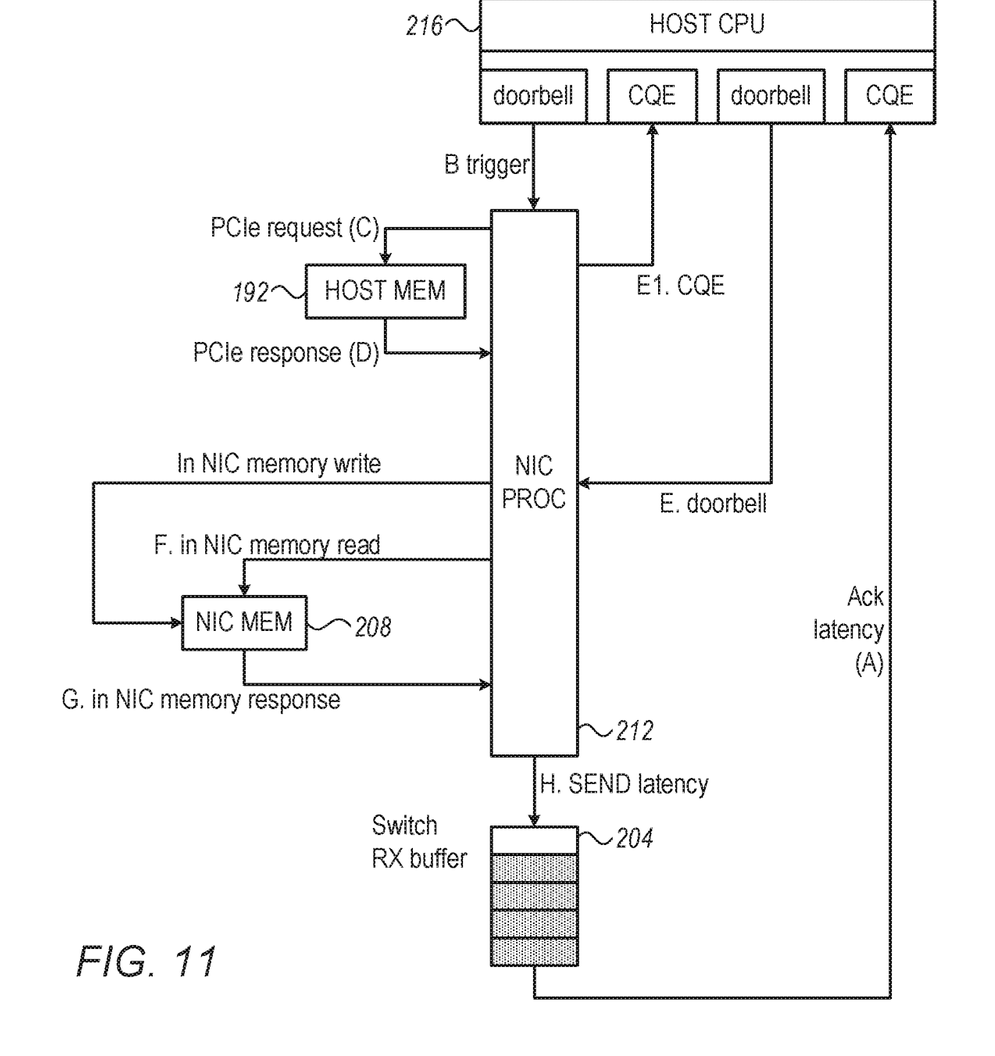
FIG. 11 is a block diagram that schematically illustrates software-controlled prefetching in a network adapter, in accordance with an embodiment of the present invention.

FIG. 11 is a block diagram that schematically illustrates software-controlled prefetching in a network adapter, in accordance with an alternative embodiment of the present invention. In this embodiment, the prefetching operations of NIC processor 212 are controlled ("orchestrated") by software running on a host CPU 216 (e.g., a CPU of the node 184 that hosts NIC 200).

In this embodiment, the software on host CPU 216 runs two QPs that implement respective doorbell/completion processes:

A send QP, implementing a first doorbell/completion process that permits sending of a data unit from NIC 200 to RX buffer 204 only after prefetching of this data unit to NIC memory 208 is complete. In this process, the software issues a doorbell (labeled "B trigger" in the figure) to NIC processor 212. This doorbell notifies NIC processor 212 it is permitted to send the next data unit to RX buffer 204 (since the data unit has been prefetched to NIC memory 208). Upon sending the data unit, NIC processor 212 sends a CQE (labeled E1.CQE) to host CPU 216. The software waits for the CQE in order to issue the next doorbell.

A prefetch QP, implementing a second doorbell/completion process that permits prefetching of a new data unit from host memory 192 to NIC memory 208 only after the switch has acknowledged that a data unit was emptied from RX buffer 204. In this process, the software issues a doorbell (labeled "E.doorbell" in the figure) to NIC processor 212. This doorbell notifies NIC processor 212 it is permitted to prefetch a new data unit (since a data unit was vacated from RX buffer 204). In response to an acknowledgement from switch 188 (denoted "A" and indicating that a data unit was vacated from RX buffer 204) a CQE is posted to the software on CPU 216. The software waits for the CQE in order to issue the next doorbell.

In some embodiments, the operation of prefetching data from host memory 192 to NIC memory 208 is performed using a novel "Local Direct Memory Access" (LDMA) command, which is implemented using a LDMA WQE posted on the prefetch QP described above. To prefetch certain data, host CPU 216 posts a LDMA WQE on the prefetch QP, and NIC processor 212 performs the data transfer when serving the LDMA WQE. When executing the LDMA command, the NIC processor transfers the specified data from the specified source location to the specified destination location directly, without triggering or otherwise involving the host CPU.

In some embodiments the LDMA WQE specifies transfer of data from any memory location to any other, wherein the source and the destination of the data may each reside either in host memory 192 or in NIC memory 208. In the special case of prefetching, the source is a memory location in the host memory, and the destination is a memory location in the NIC memory. Unlike RDMA WRITE commands, in the LDMA command both read and write can be performed on local memory, despite the prefetch QP being connected to a remote location. In some embodiments the LDMA command can both read and write to NIC memory 208 in parallel to data being read and written to host memory 192, while maintaining the full NIC bandwidth.

Figure 12:
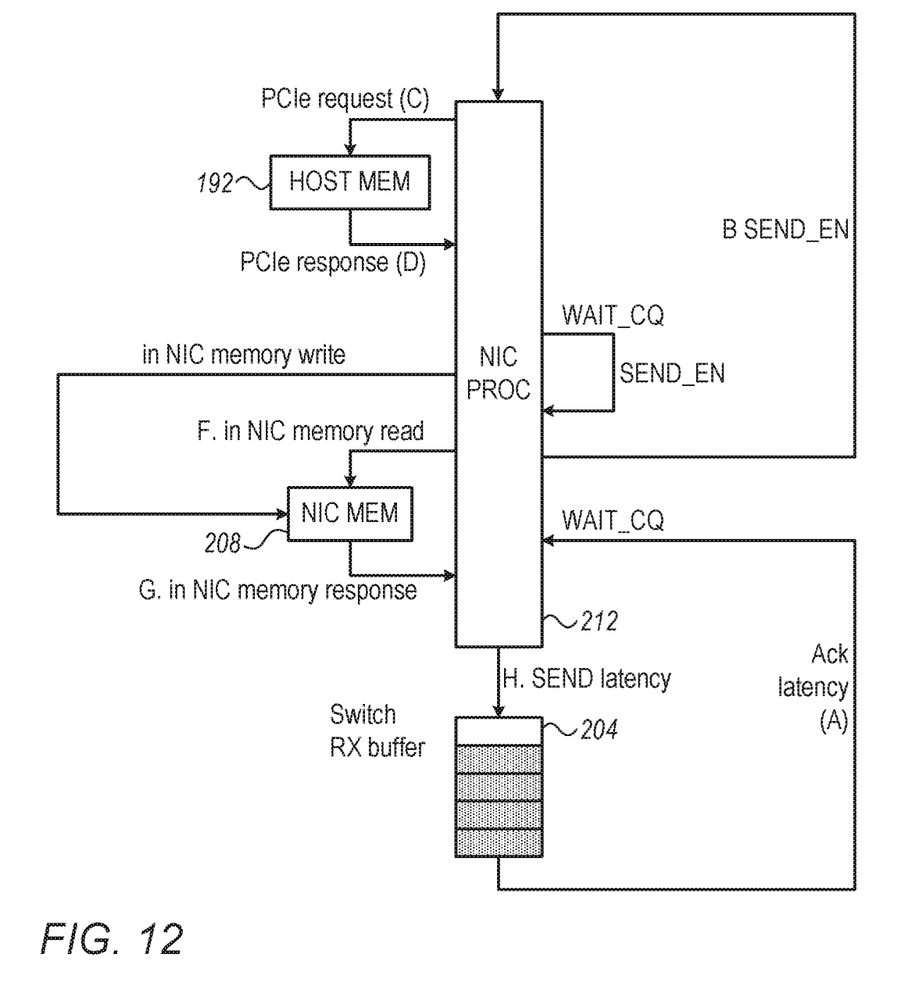
FIGS. 12 and 13 are diagrams that schematically illustrate offloaded orchestration of prefetching in a network adapter, in accordance with an embodiment of the present invention.
Figure 13:
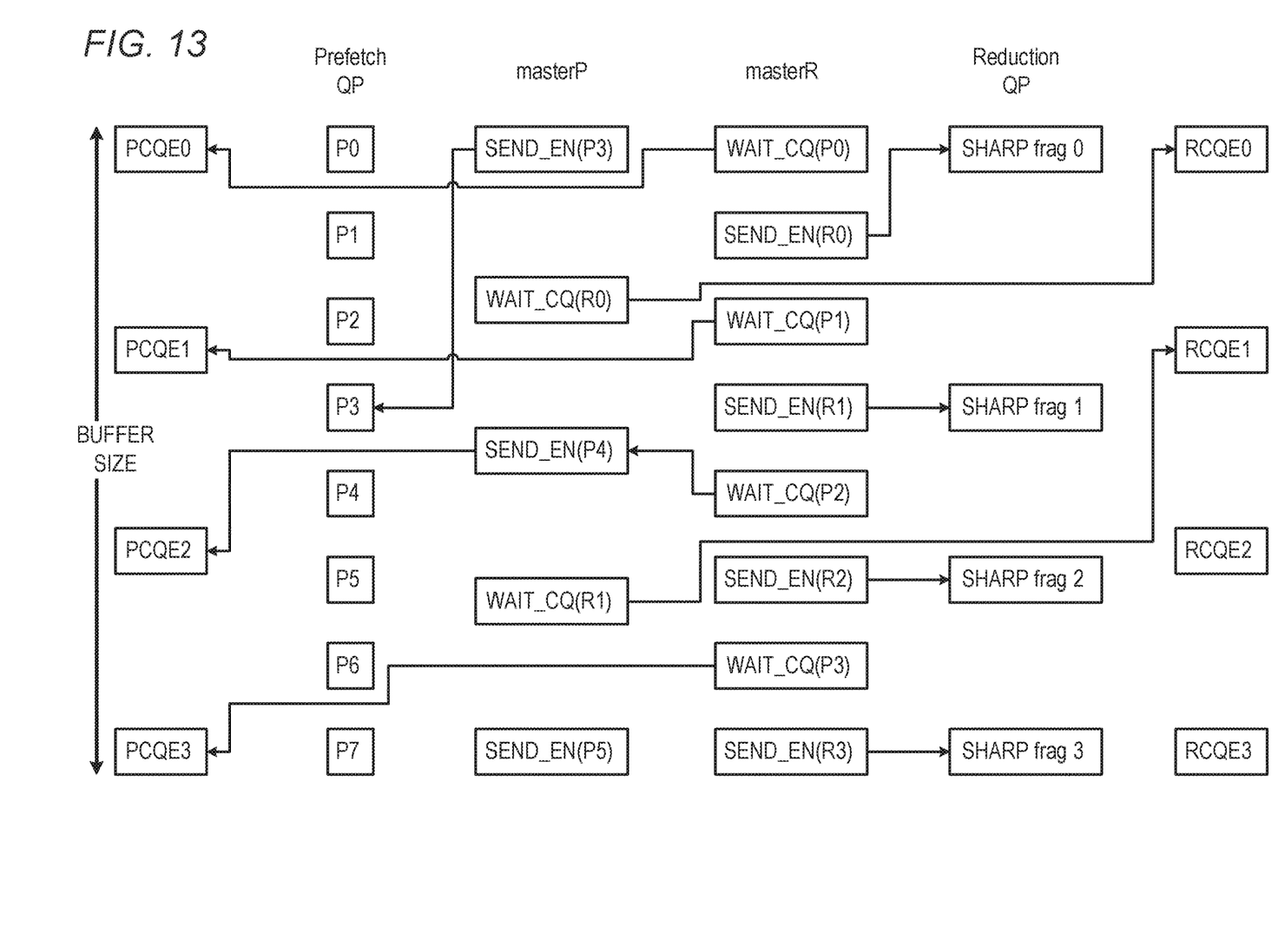

FIGS. 12 and 13 are diagrams that schematically illustrate offloaded orchestration of prefetching in a network adapter, in accordance with an embodiment of the present invention. Reference is made to both figures in parallel. In this embodiment, orchestration is performed using Queue Pairs (QPs) that reside in NIC memory 208 and are scheduled and served by NIC processor 212. In some embodiments the QP contexts may be cached outside NIC memory 208, e.g., in host memory 192, and fetched (or prefetched) to NIC memory 208 as needed. The QPs are configured to fetch data to a staging buffer in NIC memory 208, regardless of the current network state (e.g., free link layer buffers, transport layer credits, etc.). Data is read from the staging buffer in the NIC memory and sent to network when transport layer conditions permit.

The orchestration mechanism makes use of two types of WQEs, also referred to as primitives—a WAIT_CQ WQE and a SEND_EN WQE. A WAIT_CQ WQE of the form WAIT_CQ(Pn) instructs NIC processor 212 to wait until data unit Pn has been prefetched to NIC memory 208. A WAIT_CQ WQE of the form WAIT_CQ(Rn) instructs NIC processor 212 to wait until data unit Rn has been vacated from RX buffer 204. A SEND_EN WQE of the form SEND_EN(Pn) instructs NIC processor 212 to prefetch data unit Pn from host memory 192 to NIC memory 208. A SEND_EN WQE of the form SEND_EN(Rn) instructs NIC processor 212 to send data unit Rn to RX buffer 204. The SEND_EN(Rn) WQE is similar to pushing the doorbell on QP Rn. Further aspects of the operation of the various QPs seen in FIG. 13 are addressed in U.S. Provisional Patent Application 63/047,275, cited above.

The configurations of the various systems, networks, hosts, network adapters and network elements shown in FIGS. 1, 3, 8, 9A, 9B, 11 and 12, and their various components, are example configurations that are depicted purely for the sake of conceptual clarity. Any other suitable configurations can be used in alternative embodiments.

In various embodiments, the elements of the various systems, networks, hosts, network adapters and network elements shown in FIGS. 1, 3, 8, 9A, 9B, 11 and 12, may be implemented using suitable hardware, such as one or more Application-Specific Integrated Circuits (ASIC) or Field-Programmable Gate Arrays (FPGA), using software, or using a combination of hardware and software elements.

In some embodiments, certain elements, e.g., some or all functions of host CPU 40, host CPU 216, NIC processor 56 and/or NIC processor 212, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Network-Connected Device (NCD), comprising:
a network interface for communicating over a network;
a host interface for communicating with a host;
an NCD memory, configured to buffer packet information that originates from the host and pertains to a packet to be transmitted to the network at a specified transmission time; and
an NCD processor, configured to prefetch the packet information from the host to the NCD memory before the specified transmission time for buffering in the NCD memory, to process the buffered packet information before the specified transmission time, and to transmit the packet to the network at the specified time, wherein processing of the packet information and transmission of the packet are decoupled from buffering of the packet information, and wherein prefetching of the packet information and transmission of the packet at the specified time are performed by maintaining one or more queues in the NCD.

2. The NCD according to claim 1, wherein the packet information comprises one or more Work Queue Elements (WQEs) that instruct transmission of the packet.

3. The NCD according to claim 1, wherein the packet information comprises at least a part of the packet.

4. The NCD according to claim 1, wherein the packet information comprises metadata relating to the packet.

5. The NCD according to claim 1, wherein the host interface is configured to communicate with the host over a Peripheral Component Interconnect Express (PCIe) bus, and wherein the NCD processor is configured to access the packet information without communicating over the PCIe bus.

6. The NCD according to claim 1, wherein the NCD processor is configured to prefetch the packet information by maintaining a prefetch Queue-Pair (QP) in the NCD, the prefetch QP configured to queue one or more prefetch Work Queue Elements (WQEs) that specify prefetching of the packet information to the NCD memory.

7. The NCD according to claim 1, wherein the NCD processor is configured to maintain a synchronization Queue-Pair (QP), which queues doorbells that prevent transmission of the packet before the packet has been prefetched to the NCD memory.

8. A method, comprising:
in a Network-Connected Device (NCD) that is connected to a host and to a network, prefetching from the host, and buffering, packet information that originates from the host and pertains to a packet to be transmitted to the network at a specified transmission time, wherein prefetching of the packet information is performed before the specified transmission time; and processing the buffered packet information by the NCD before the specified transmission time, thereby transmitting the packet to the network at the specified transmission time, wherein processing of the packet information and transmission of the packet are decoupled from buffering of the packet information, and wherein prefetching of the packet information and transmission of the packet at the specified time are performed by maintaining one or more queues in the NCD.

9. The method according to claim 8, wherein the packet information comprises one or more Work Queue Elements (WQEs) that instruct transmission of the packet.

10. The method according to claim 8, wherein the packet information comprises at least a part of the packet.

11. The method according to claim 8, wherein the packet information comprises metadata relating to the packet.

12. The method according to claim 8, wherein buffering the packet information comprises communicating with the host over a Peripheral Component Interconnect Express (PCIe) bus, and wherein processing the buffered packet information is performed without communicating over the PCIe bus.

13. The method according to claim 8, wherein prefetching the packet information comprises maintaining a prefetch Queue-Pair (QP) in the NCD, and queuing in the prefetch QP one or more prefetch Work Queue Elements (WQEs) that specify prefetching of the packet information to the NCD memory.

14. The method according to claim 8, wherein prefetching the packet information comprises maintaining a synchronization Queue-Pair (QP), and queuing in the synchronization QP doorbells that prevent transmission of the packet before the packet has been prefetched to the NCD memory.

* * * * *